US008917035B2

(12) United States Patent
Zhang et al.

(10) Patent No.: US 8,917,035 B2
(45) Date of Patent: Dec. 23, 2014

(54) VOLTAGE REGULATION CIRCUIT AND LIGHT EMITTING DIDOE DRIVING APPARATUS HAVING THE SAME

(75) Inventors: Wei-Qiang Zhang, Shanghai (CN); Yan Zhong, Shanghai (CN); Jian-Ping Ying, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 57 days.

(21) Appl. No.: 13/541,680

(22) Filed: Jul. 4, 2012

(65) Prior Publication Data
US 2013/0119874 A1 May 16, 2013

(30) Foreign Application Priority Data

Nov. 14, 2011 (CN) .......................... 2011 1 0359055

(51) Int. Cl.
*G05F 1/00* (2006.01)
*H05B 37/02* (2006.01)
*H05B 39/04* (2006.01)
*H05B 41/36* (2006.01)

(52) U.S. Cl.
CPC ............... *H05B 37/02* (2013.01); *Y02B 20/347* (2013.01)
USPC ...................................... 315/307; 315/209 R

(58) Field of Classification Search
None
See application file for complete search history.

(56) References Cited

U.S. PATENT DOCUMENTS

| | | | | |
|---|---|---|---|---|
| 8,344,638 | B2 * | 1/2013 | Shteynberg et al. | 315/247 |
| 2006/0197469 | A1 * | 9/2006 | Kim | 315/291 |
| 2007/0296887 | A1 * | 12/2007 | Nakao et al. | 349/62 |
| 2008/0136350 | A1 * | 6/2008 | Tripathi et al. | 315/294 |
| 2009/0187925 | A1 * | 7/2009 | Hu et al. | 719/327 |
| 2010/0109537 | A1 * | 5/2010 | Nishino et al. | 315/185 R |
| 2010/0213857 | A1 * | 8/2010 | Fan | 315/186 |
| 2011/0181625 | A1 * | 7/2011 | Shin et al. | 345/690 |
| 2012/0153844 | A1 * | 6/2012 | Chobot | 315/185 R |

FOREIGN PATENT DOCUMENTS

CN 201311605 Y 9/2009
CN 102083264 A 6/2011

* cited by examiner

*Primary Examiner* — Douglas W Owens
*Assistant Examiner* — Dedei K Hammond
(74) *Attorney, Agent, or Firm* — CKC & Partners Co., Ltd.

(57) ABSTRACT

A voltage regulation circuit includes a voltage conversion module, an LED driving module and a control module. The voltage conversion module is operable to receive and convert the first voltage to a second voltage. Each LED driving loop of the LED driving module has a current regulator and an LED string. The control module is operable to output a control signal according to the received input signal which reflects the current flowing through the LED driving module. The voltage conversion module regulates the second voltage according to the control signal, such that the regulated second voltage still keeps the brightness of the LED string of each LED driving loop unchanged.

34 Claims, 12 Drawing Sheets

VOLTAGE REGULATION CIRCUIT AND LIGHT EMITTING DIDOE DRIVING APPARATUS HAVING THE SAME

RELATED APPLICATIONS

This application claims priority to Chinese Application Serial Number 201110359055.8, filed Nov. 14, 2011, which is herein incorporated by reference.

BACKGROUND

1. Field of Invention

The present disclosure relates to a technology of driving an LED string. More particularly, the present disclosure relates to a voltage regulation circuit for regulating a voltage loaded on a current regulator in an LED driving apparatus.

2. Description of Related Art

In the prior art, when an LED string is connected to a DC voltage source for operation, in general, a current regulator is required to be connected in series with the LED string, so as to stabilize the working current of the LED string by using the constant current characteristic of the current regulator. For example, a voltage conversion module can be used to convert a DC or AC input voltage to a constant DC voltage, and the DC voltage is electrically connected to the current regulator, so as to provide a working voltage for LED string.

In various actual application situations of the LED string, a plurality of LED driving modules are often adopted and connected in parallel to the DC voltage (i.e. the output voltage of the voltage conversion module). Each LED driving module includes a current regulator and an LED string connected in series with the current regulator. Due to the property differences among different LEDs, even two LED strings with the same number of LEDs may have different working voltages. Therefore, to keep the LEDs of each LED string working normally, the output voltage of the voltage conversion module should be set to a voltage value slightly higher than a maximum working voltage of the LED string. That is, the output voltage has to provide a safety margin relative to the maximum working voltage.

Furthermore, the current regulator and the LED string of each LED driving module are connected in series. The current regulator needs to hold a differential voltage between the output voltage $V_O$ and the working voltage $V_F$ of the LED string. The higher differential voltage results in a larger loss of the current regulator, and the energy consumption of the system is increased accordingly. For example, if the output voltage of the voltage conversion module is constantly a 24V DC voltage; the LED string has 6 LEDs; and the voltage drop of each LED is 3V when working normally, then the voltage drop of the current regulator connected in series with the LED string is 6V, and the current flowing through the current regulator is equal to the current of the LED string. Therefore, the loss of the current regulator is large and the system efficiency is low.

In view of the foregoing, those skilled in the industry are endeavoring to find ways to design a voltage regulation circuit for enabling the output voltage of the voltage conversion module to be self-regulated according to the current flowing through the LED string and meanwhile reducing the loss of the current regulator and promoting the system efficiency without affecting the brightness of the LED string.

SUMMARY

Directed to the deficiencies existing in the circuit design of the LED driving apparatus in the prior art, the present disclosure provides a voltage regulation circuit and an LED driving apparatus having the voltage regulation circuit.

According to an aspect of the disclosure, a voltage regulation circuit for an LED driver is provided, and includes a voltage conversion module, an LED driving module and a control module. The voltage conversion module is operable to receive a first voltage and convert the first voltage to a second voltage. The first voltage is a DC voltage or an AC voltage, and the second voltage is a DC voltage. The LED driving module includes at least one LED driving loop, and each LED driving loop has a current regulator and an LED string. The current regulator is electrically connected to the second voltage outputted by the voltage conversion module. The LED string is connected in series with the current regulator. The control module is operable to receive an input signal and output a control signal to the voltage conversion module according to the input signal. The input signal reflects the current flowing through the LED driving module. The voltage conversion module regulates the second voltage according to the control signal, such that the regulated second voltage still can keep the brightness of the LED string of each LED driving loop unchanged.

The control module includes a comparator and a control unit. The comparator has a first input end, a second input end and an output end. The first input end is operable to receive a reference voltage corresponding to the second voltage. The second input end is operable to receive a feedback voltage corresponding to the second voltage. The output end outputs a comparison signal. The control unit is electrically connected to the output end of the comparator, and is operable to receive the comparison signal and output the control signal according to the comparison signal. In a specific embodiment, the input signal is superposed on a reference voltage of the first input end of the comparator. In another specific embodiment, the input signal is superposed on a feedback voltage of the second input end of the comparator. In still another specific embodiment, the comparator further includes a third input end operable to receive the input signal, such that the output end outputs the comparison signal.

The current regulator is a linear regulator.

When the current flowing through the LED driving module is greater than a first reference current, the control module outputs a first control signal, and the voltage conversion module reduces the second voltage according to the first control signal.

The first reference current is about 80%~100% of a rated current flowing through the LED driving module. Furthermore, the first reference current is 95% of a rated current flowing through the LED driving module.

When the current flowing through the LED driving module is smaller than a second reference current, the control module outputs a second control signal, and the voltage conversion module increases the second voltage according to the second control signal. When the second voltage obtained based on the second control signal is smaller than a rated voltage, a current flowing through the LED driving module is continuously sampled.

The second reference current is about 80%~100% of the first reference current. Furthermore, the second reference current is about 95% of the first reference current.

When the second voltage is equal to the rated voltage, the rated current flowing through the LED driving module is reset, and the current flowing through the LED driving module is compared with the reset rated current, the control module outputs a third control signal according to the comparison result, and the voltage conversion module regulates the second voltage according to the third control signal.

When a new LED string is incorporated to the LED driving module and the current flowing through the LED driving module is greater than a third reference current, the control module outputs a fourth control signal, and the voltage conversion module increases the second voltage to a rated voltage according to the fourth control signal.

The third reference current is about 100%~130% of the first reference current. Furthermore, the third reference current is about 120% of the first reference current.

The voltage conversion module includes an isolating transformer, a power switch and a driving circuit. The isolating transformer has a primary winding and a secondary winding. One end of the primary winding is electrically connected to the first voltage, and the secondary winding is electrically connected to the second voltage. The power switch has a first end, a second end and a third end. The second end is electrically connected to the other end of the primary winding, and the third end is electrically connected to the first voltage. The driving circuit is electrically connected to the first end of the power switch and the control module, and is operable to amplify the control signal and drive the power switch to execute a turn-on/turn-off operation based on the control signal, so as to regulate the second voltage by regulating the first voltage.

The control module includes a microprocessor. The microprocessor has a modulus conversion interface and an output end. The modulus conversion interface is operable to sample the current flowing through the LED driving module and convert the sampled current to a digital signal. The output end is operable to output the control signal corresponding to the digital signal.

The voltage regulation circuit further includes a light modulation switch, and the microprocessor further comprises a PWM output end. The PWM output end outputs a PWM signal to control the light modulation switch, so as to regulate an average current flowing through the LED string. The voltage regulation circuit further includes a PWM driver between the PWM output end of the microprocessor and the light modulation switch to amplify the PWM signal.

Currents flowing through the LED strings of different LED driving loops are different.

In a specific embodiment, the voltage conversion module includes a power factor correction (PFC) circuit and a DC-DC converter electrically connected to the PFC circuit. In another specific embodiment, the voltage conversion module includes an AC-DC converter. In still another specific embodiment, the voltage conversion module includes a DC-DC converter.

According to an aspect of the disclosure, a voltage regulation circuit for an LED driver is provided, which includes a voltage conversion module, a first LED driving module, a second LED driving module and a control module. The voltage conversion module is operable to receive a first voltage and convert the first voltage to a second voltage. The first voltage is a DC voltage or an AC voltage, and the second voltage is a DC voltage. Each of the first LED driving module and the second LED driving module includes at least one LED driving loop. Each LED driving loop has a current regulator and an LED string. The current regulator is electrically connected to the second voltage outputted by the voltage conversion module. The LED string is connected in series with the current regulator. The control module is operable to receive a first input signal and a second input signal and output a control signal to the voltage conversion module according to the first input signal and/or the second input signal. The first input signal reflects the current flowing through the first LED driving module, and the second input signal reflects the current flowing through the second LED driving module. The voltage conversion module regulates the second voltage according to the control signal, such that the regulated second voltage can still keep a brightness of the LED string of each LED driving loop of the first LED driving module and the second LED driving module unchanged.

The control module includes a microprocessor. The microprocessor has a first modulus conversion interface, a second modulus conversion interface and an output end. The first modulus conversion interface is operable to sample a first current signal flowing through the first LED driving module and convert the first current signal to a first digital signal. The second modulus conversion interface is operable to sample a second current signal flowing through the second LED driving module and convert the second current signal to a second digital signal. The output end is operable to output the control signal to the voltage conversion module according to the first digital signal and/or the second digital signal.

When a critical value of the second voltage obtained by the voltage regulation circuit based on the regulation of the first digital signal is higher than a critical value of the second voltage obtained by the voltage regulation circuit based on the regulation of the second digital signal, the output end of the microprocessor outputs the control signal according to the first digital signal.

The first LED driving module further includes a first light modulation switch, and the microprocessor further has a first output end. The first output end outputs a first PWM signal to control the first light modulation switch, so as to regulate an average current flowing through the LED string of the first LED driving module. Furthermore, the voltage regulation circuit further includes a first PWM driver, disposed between the first output end of the microprocessor and the first light modulation switch and operable to amplify the first PWM signal.

The second LED driving module further includes a second light modulation switch, and the microprocessor further has a second output end. The second output end outputs a second PWM signal to control the second light modulation switch, so as to regulate an average current flowing through the LED string of the second LED driving module. Furthermore, the voltage regulation circuit further includes a second PWM driver between the second output end of the microprocessor and the second light modulation switch to amplify the second PWM signal.

The number of the LED driving loop of the first LED driving module is equal to the number of the LED driving loop of the second LED driving module.

In a specific embodiment, the voltage conversion module includes a power factor correction (PFC) circuit and a DC-DC converter electrically connected to the PFC circuit. In another specific embodiment, the voltage conversion module includes an AC-DC converter. In still another specific embodiment, the voltage conversion module includes a DC-DC converter.

According to an aspect of the disclosure, an LED driving apparatus is provided, which includes at least one LED string. The LED driving apparatus includes the aforementioned voltage regulation circuit.

According to the voltage regulation circuit and the LED driving apparatus having the same of the present disclosure, the control module is used to receive the input signal operable to reflect the current flowing through the LED driving module and output the corresponding control signal according to the input signal, and further regulate the output voltage of the voltage conversion module, such that the output voltage can still keep the brightness of the LED string of each LED driving loop unchanged and further significantly reduces the loss of the current regulator, thereby improving the system efficiency.

BRIEF DESCRIPTION OF THE DRAWINGS

The disclosure can be more fully understood by reading the following detailed description of the embodiment, with reference to the accompanying drawings as follows.

DETAILED DESCRIPTION

The present disclosure will be described in the following embodiments with reference to the accompanying drawing, but these embodiments are not intended to limit the present disclosure. The description of structure operation does not mean to limit its implementation order. Any device with equivalent functions that is produced from a structure formed by recombination of elements shall fall within the scope of the present disclosure. The drawings are only illustrative and are not made according to the original size.

The implementations of the present disclosure are described in considerable detail with reference to the embodiments in accompanying with drawings.

Figure 1:
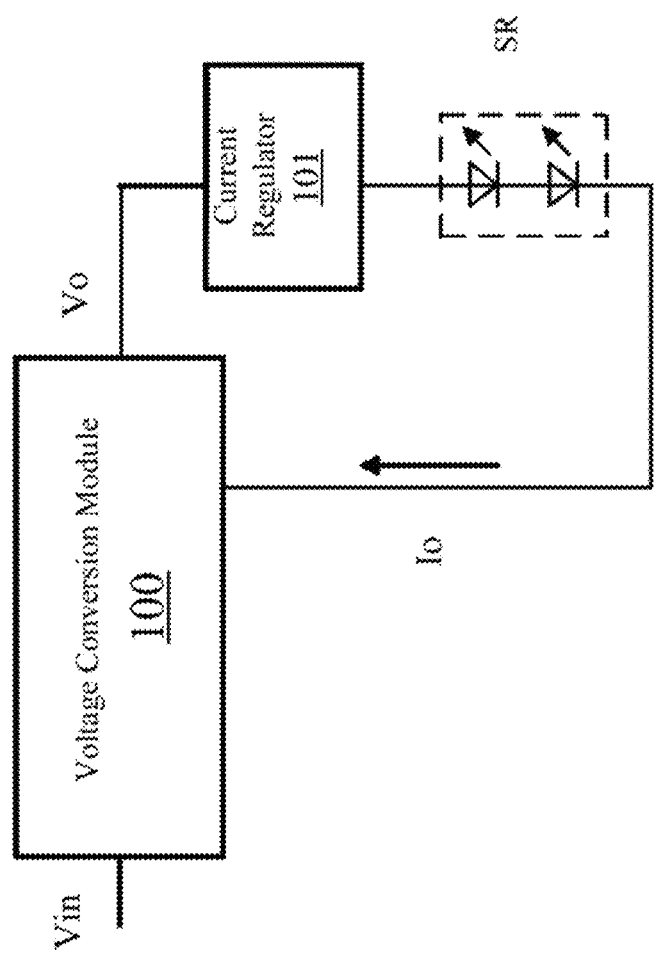
FIG. 1 is a circuit principle diagram showing an LED driving apparatus in the prior art.

FIG. 1 is a circuit principle diagram showing an LED driving apparatus in the prior art. As described above, when the LED string is connected to a DC voltage source for operation, a current regulator usually is required to be connected in series with the LED string, such that the working current of the LED string may be stabilized by a constant current characteristic of the current regulator. Referring to FIG. 1, the driving circuit for the LED string includes a voltage conversion module 100 and an LED driving loop. The LED driving loop is formed from a current regulator 101 and an LED string SR connected in series with the current regulator 101. The LED string includes several LEDs.

After receiving an input voltage Vin, the voltage conversion module 100 converts the input voltage Vin to obtain an output voltage Vo. Generally, in consideration of a discrete characteristic of a working voltage $V_F$ of the LED string SR, the voltage Vo outputted by the voltage conversion module 100 usually is a certain value greater than working voltage $V_F$, such that, when an LED characteristic of the LED string is changed, the output voltage Vo can still ensure the current flowing through the LED string to be relatively stable.

Figure 2:
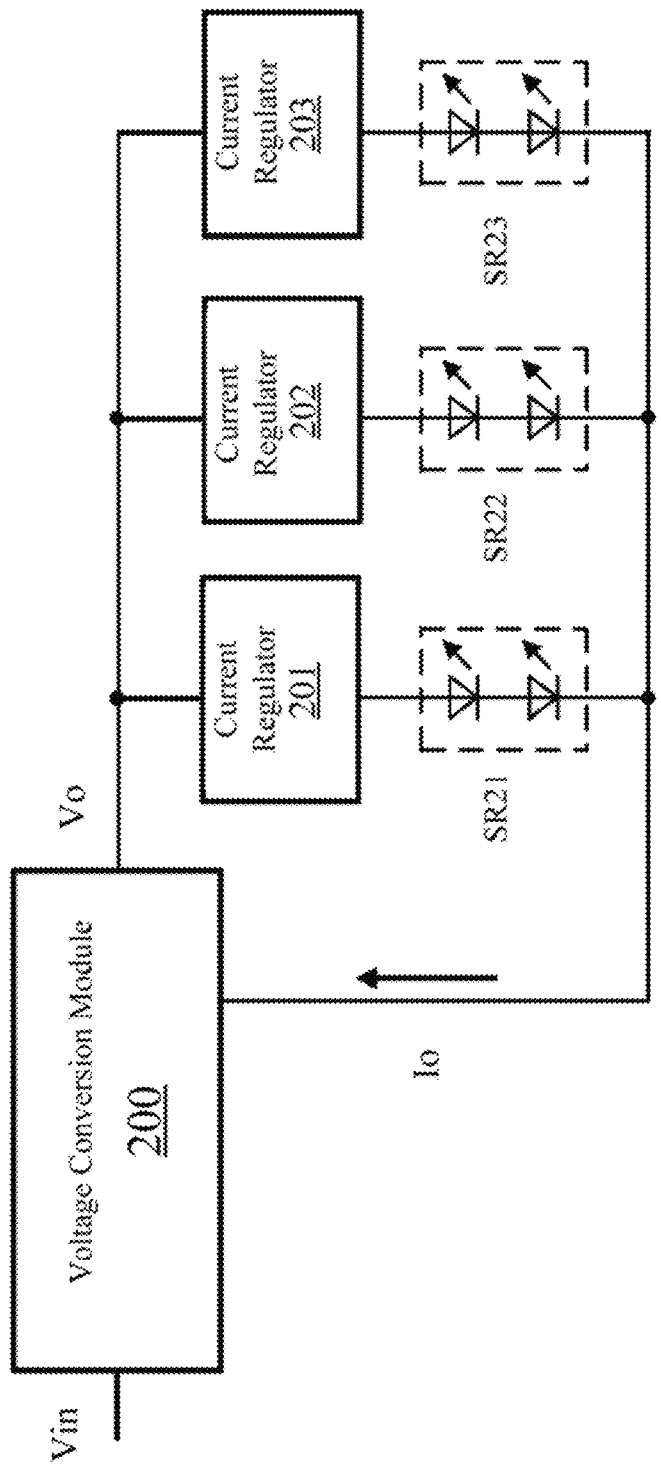
FIG. 2 is a circuit principle diagram of an LED driving apparatus used for driving a plurality of LED strings in the prior art.

FIG. 2 is a circuit principle diagram of an LED driving apparatus used for driving a plurality of LED strings in the prior art. Similar to FIG. 1, the driving circuit in FIG. 2 includes a voltage conversion module 200. The voltage conversion module 200 converts the received input voltage Vin to a DC output voltage Vo, and Vo provides the voltage value required by the normal working of the LED string. However, the output end of the voltage conversion module in FIG. 2 is connected in parallel with three LED driving loops, which are the first LED driving loop composed of a current regulator 201 and an LED string SR21; the second LED driving loop composed of a current regulator 202 and an LED string SR22; and the third driving loop composed of a current regulator 203 and an LED string SR23.

Referring to FIG. 2, each LED driving loop includes a current regulator and an LED string connected in series with the current regulator. Due to the characteristic difference of different LEDs or the discrete characteristic of the LED string when in operation, even two LED strings with the same number of LEDs may have different working voltages. Therefore, in order to keep the LEDs of each LED string working normally, the output voltage Vo of the voltage conversion module 200 should be set to a voltage value slightly higher than a maximum working voltage of the LED string. For example, in FIG. 2, the maximum working voltage of the LED string SR21 is $V_{F1}$; the maximum working voltage of the LED string SR22 is $V_{F2}$; and the maximum working voltage of the LED string SR23 is $V_{F3}$, wherein $V_{F1} < V_{F2} < V_{F3}$. The output voltage Vo of the voltage conversion module 200 has to be a certain value greater than voltage $V_{F3}$. That is, the output voltage Vo has to provide a safety margin for the maximum working voltage $V_{F3}$.

However, the higher output voltage Vo of the voltage conversion module 200 results in a larger loss of the current regulator, and the system efficiency is reduced accordingly. In the prior art, those skilled in the industry are endeavoring to find ways to establish an internal linkage between the output voltage Vo and the current flowing through the LED string, so as to automatically reduce the output voltage Vo without affecting the brightness of the LEDs of the LED string when the current is changed, thereby reducing the loss of the current regulator.

Figure 3:
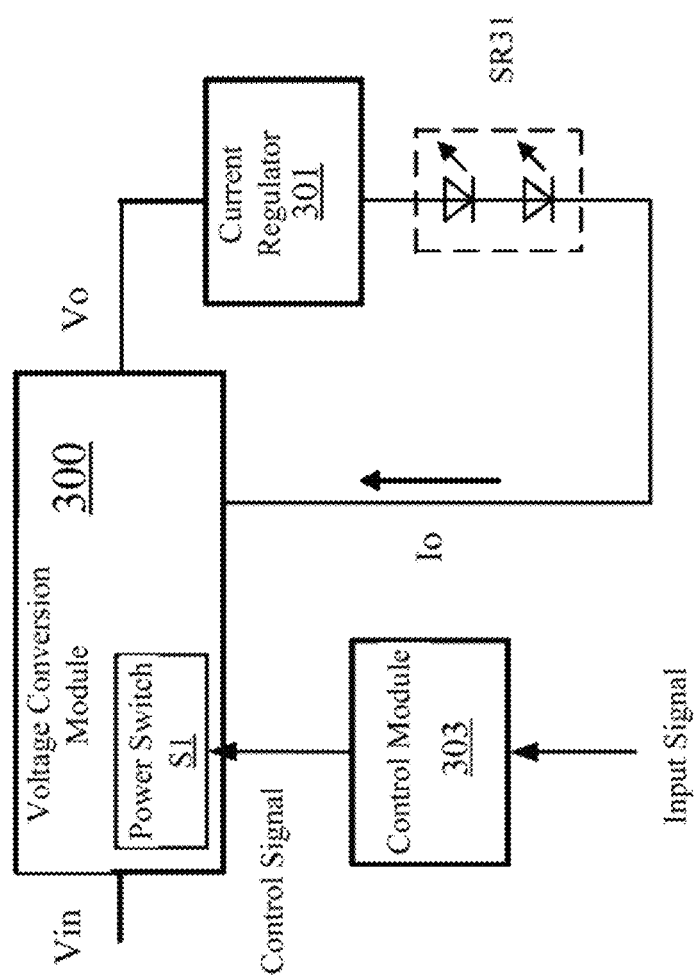
FIG. 3 is a principle diagram of a voltage regulation circuit for an LED driving apparatus according to an embodiment of the present disclosure.

FIG. 3 is a principle diagram of a voltage regulation circuit for an LED driving apparatus according to an embodiment of the present disclosure. Referring to FIG. 3, the voltage regulation circuit includes a voltage conversion module 300, an LED driving module and a control module 303.

In details, the voltage conversion module 300 includes at least one power element S1 which is controlled to be on or off by a control signal received by a control end thereof. The voltage conversion module 300 receives a first voltage Vin, and converts the first voltage Vin to a second voltage Vo. The first voltage Vin is a DC voltage or an AC voltage, and the second voltage Vo is a DC voltage. In a specific embodiment, the voltage conversion module 300 includes a PFC circuit and a DC-DC converter electrically connected to the PFC circuit. In another specific embodiment, the voltage conversion module 300 includes an AC-DC converter, operable to convert the AC voltage Vin to a DC output voltage Vo. In still another specific embodiment, the voltage conversion module 300 includes a DC-DC converter which is operable to convert the DC voltage Vin to the DC output voltage Vo.

The LED driving module includes at least one LED driving loop. Those skilled in the art should understand that FIG. 3 merely illustrates one LED driving loop as an example, but the present disclosure is not limited thereto. For example, in some other embodiments, if the power of the entire system satisfies demands, the output voltage Vo of the voltage conversion module 300 may be further connected in parallel to two or more LED driving loops, and such alternative embodiments also fall within the spirit scope of the present disclosure. Referring to FIG. 3, the LED driving loop has a current regulator 301 and an LED string SR31. The current regulator 301 is electrically connected to the second voltage Vo outputted by the voltage conversion module 300, and the LED string SR31 and the current regulator 301 are connected in series. Furthermore, the LED driving loop and the voltage conversion module 300 form an electrical loop, and the LEDs of the LED string SR31 through which the current Io flows are in a lighting state.

The control module 303 receives an input signal, and outputs a control signal according to the input signal. In an embodiment, the control signal is a duty ratio control signal. In an embodiment, the control signal is a switching frequency control signal. In an embodiment, the control signal is the both duty ratio and the switching frequency control signal. The voltage conversion module 300 may regulate the output voltage Vo based on the control signal. The input signal is operable to reflect the current flowing through the LED driving module. For example, a resistor may be designed at a proper position of the LED driving module. When the current flowing through the LED driving module flows through the resistor, the changes of the current can be obtained by detecting the voltage loaded on the resistor. It should be particularly noted that, when the voltage conversion module 300 regulates the second voltage Vo according to the control signal from the control module 303, the regulated second voltage can still keep the brightness of the LED string of each LED driving loop unchanged. In other words, when the brightness of the LED string does not have apparent changes, the voltage value of the second voltage Vo is reduced as much as possible, such that the voltage loaded on current regulator is much lower, thereby reducing the loss of the current regulator, improving the system efficiency, and saving the electrical energy required by the system. It should be explained that the changes of the brightness of the LED string within the scope of the current flowing through the LED string not smaller than about 80% of the rated current of LED driving module are all regarded as the unchanged brightness of the LED string. It should be explained that the decreasing extent of the second voltage (i.e. the output voltage after being regulated based on the duty ratio control signal) is usually greater than a ripple component of the output voltage. For example, the ripple component of the output voltage is about 1%. As compared with the output voltage before regulation, the decreasing extent of the output voltage after being regulated based on the duty ratio control signal or the switching frequency control signal is generally greater than the ripple component about 1%.

Figure 4:
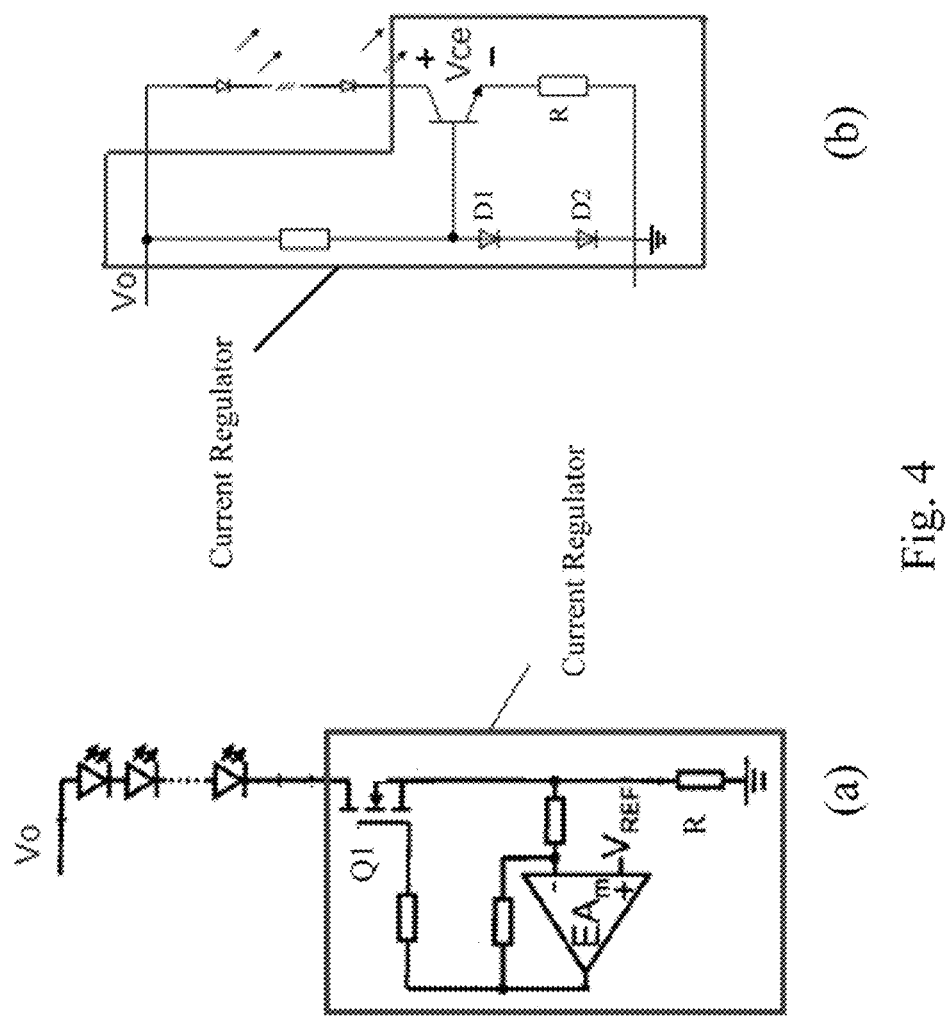
FIG. 4 is a working principle diagram of a current regulator of the voltage regulation circuit in FIG. 3.

FIG. 4 is a working principle diagram of a current regulator of the voltage regulation circuit in FIG. 3. In the design of the current regulator having the constant current characteristic, a linear regulator is preferably adopted to reduce the design cost. FIG. 4 (a) illustrates a linear current regulator according to a specific embodiment, and FIG. 4 (b) illustrates a linear current regulator according to another specific embodiment.

In FIG. 4 (a), the current of the LEDs connected with the output voltage Vo is stabilized by using a switching element Q1. In details, a gate control voltage of the switching element Q1 may be changed by changing the output voltage of the comparator. When the Q1 works in a linear region, the resistance $R_{DS}$ between the source and drain changes accordingly. Finally, the voltage loaded on two ends of the resistor R is constant, such that the current flowing through the LEDs remains constant.

In FIG. 4 (b), the total voltage drop of the diodes D1 and D2 is 1.4V. When the voltage between the base and the emitter of the triode is greater than the turn-on voltage by 0.7V, the voltage loaded on two ends of the resistor R is 0.7V. Meanwhile, the current flowing through the resistor R remains constant. Since the LED and the resistor R are connected in series, the current flowing through the LED remains constant after the transistor is conducted.

Figure 5:
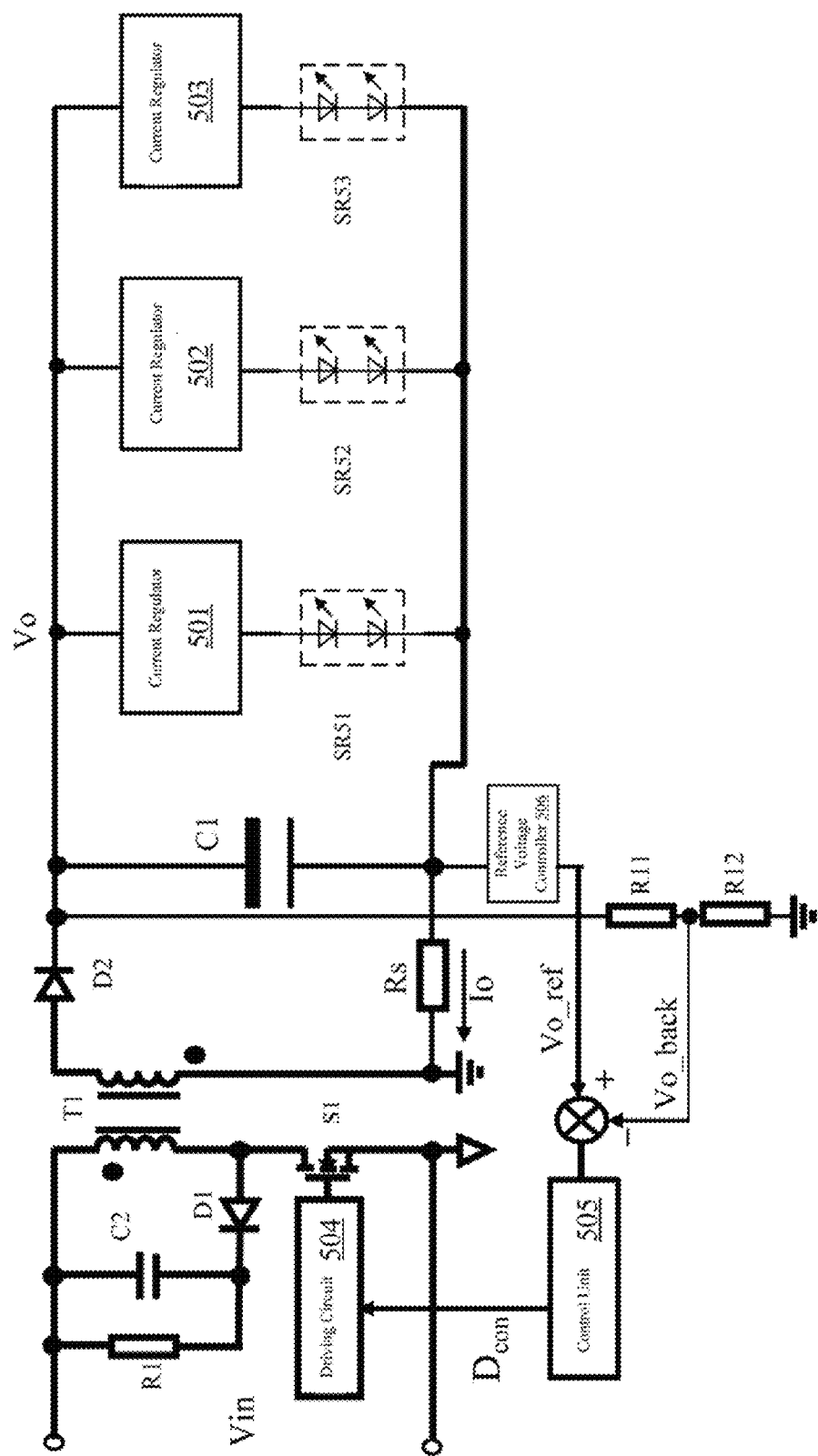
FIG. 5 is a circuit diagram of regulating an output voltage of a voltage conversion module by using the voltage regulation circuit in FIG. 3 according to a preferred embodiment.

FIG. 5 is a circuit diagram of regulating an output voltage of a voltage conversion module by using the voltage regulation circuit in FIG. 3 according to a preferred embodiment. In FIG. 5, the LED driving module includes three LED driving loops, which are the first LED driving loop composed of a current regulator 501 and an LED string SR51; the second LED driving loop composed of a current regulator 502 and an LED string SR52; and the third driving loop composed of a current regulator 503 and an LED string SR53.

The voltage conversion module includes an isolating transformer T1, a power switch S1 and a driving circuit 504. The isolating transformer T1 has a primary winding and a secondary winding. One end of the primary winding is electrically connected to one end of the first voltage Vin, and the secondary winding after being rectified by the diode D2 is electrically connected to the second voltage Vo. The control end of the power switch S1 is electrically connected to the driving circuit 504, and the second end is electrically connected to the other end of the primary winding, and the third end is electrically connected to the other end of the first voltage Vin. The driving circuit 504 is electrically connected to the control end of the power switch S1 and the control module, and is operable to amplify the control signal from the control module and drive the power switch S1 to execute the ton/off operation based on the control signal, so as to regulate the second voltage Vo (such as the voltage of the secondary winding of the isolating transformer) by the first voltage Vin (such as the voltage of the primary winding of the isolating transformer).

In a specific embodiment, the control module includes a comparator and a control unit 505. The comparator has a first input end, a second input end and an output end. The first input end receives a reference voltage Vo_ref corresponding to the second voltage Vo, and the second input end receives a feedback voltage Vo_back corresponding to the second voltage Vo, and the output end outputs a comparison signal. In FIG. 5, the feedback voltage Vo_back and the output voltage Vo are in a linear relationship. The control unit 505 is electrically connected to the output end of the comparator, and is operable to receive the comparison signal and output the control signal Dcon according to the comparison signal. Subsequently, the driving circuit 504 amplifies the control signal Dcon, so as to regulate the second voltage Vo through the on/off of the power switch S1.

In a specific embodiment, the input signal that reflects the current Io flowing through the LED driving module is superposed on the reference voltage of the first input end of the comparator. For example, the input signal is a node voltage on the right side of the resistor Rs. Then, the reference voltage controller 506 sets a reference voltage Vo_ref according to the node voltage. Provided that the current flowing through the LED string SR51 is $I_{F1}$; the current flowing through the LED string SR52 is $I_{F2}$; and the current flowing through the LED string SR53 is $I_{F3}$, Io is equal to the sum of $I_{F1}$, $I_{F2}$ and $I_{F3}$. In some other embodiments, the input signal that reflects the current Io flowing through the LED driving module is superposed on the feedback voltage Vo_back of the second input end of the comparator. In some other embodiments, the input signal that reflects the current Io flowing through the LED driving module functions on the third input end of the comparator. In this embodiment, the current Io flowing through the LED driving module is sampled by sampling the resistor Rs. In some other embodiments, the current Io flowing through the LED driving module is sampled by a current transformer or a hall current sensor.

Figure 6:
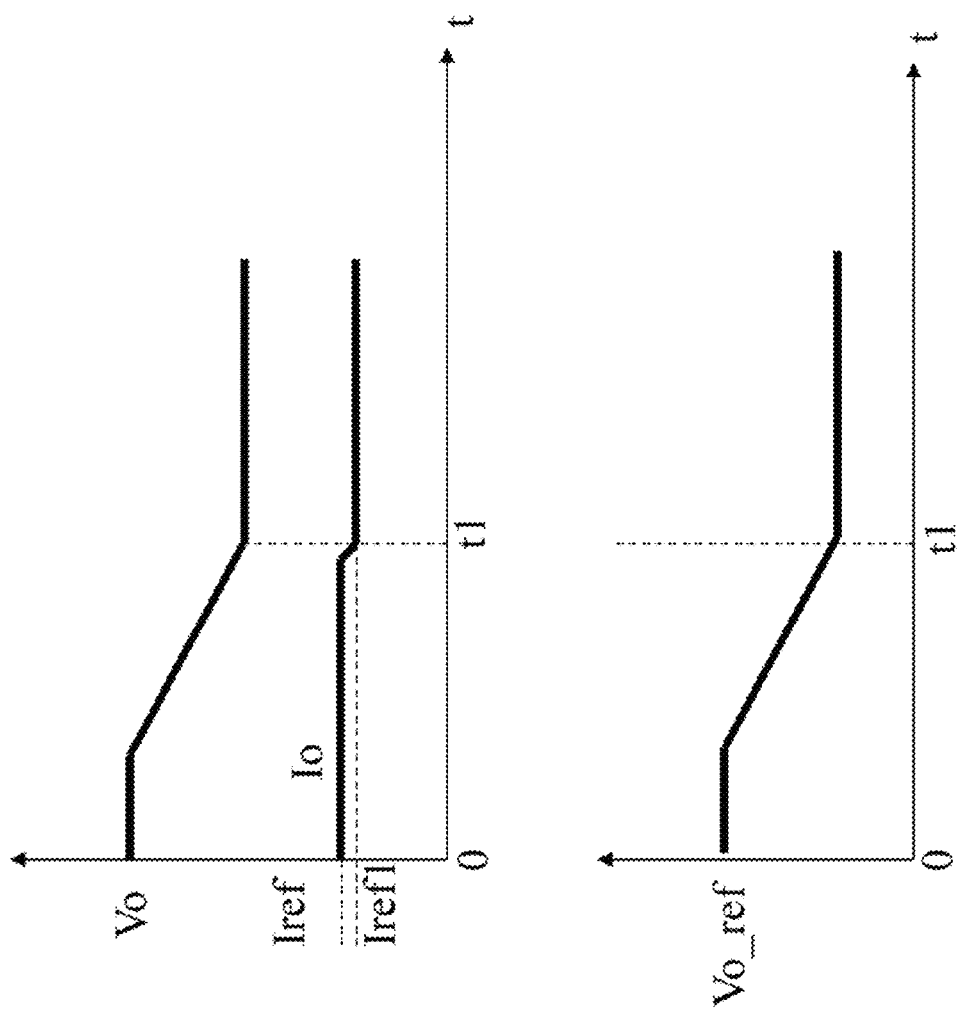
FIG. 6 illustrates a voltage waveform of an output voltage and a reference voltage and a current waveform of a current flowing through the LED string when being regulated by the voltage regulation circuit in FIG. 5.

FIG. 6 illustrates a voltage waveform of an output voltage and a reference voltage and a current waveform of a current flowing through the LED string when being regulated by the voltage regulation circuit in FIG. 5.

Referring to FIG. 6 (*a*) and FIG. 6 (*b*), when the reference voltage Vo_ref is reduced, the output voltage Vo of the voltage conversion module is gradually reduced. When the current Io flowing through the LED driving module (initially set to be the current Iref) is greater than a first reference current Iref1, the reference voltage controller 506 reduces the reference voltage Vo_ref, and the control module outputs a first control signal according to the reference voltage Vo_ref and the feedback voltage Vo_back, and the voltage conversion module reduces the value of the second voltage Vo according to the first control signal. If the corresponding current obtained when the brightness of the LED string does to not have apparent changes is the first reference current Iref1, the minimal value of the second voltage Vo can be lowered to the voltage value corresponding to the first reference current ken based on the first control signal.

In a specific embodiment, the first reference current is about 80%~100% of the rated current flowing through the LED driving module. Preferably, the first reference current is about 95% of the rated current flowing through the LED driving module.

Figure 7:
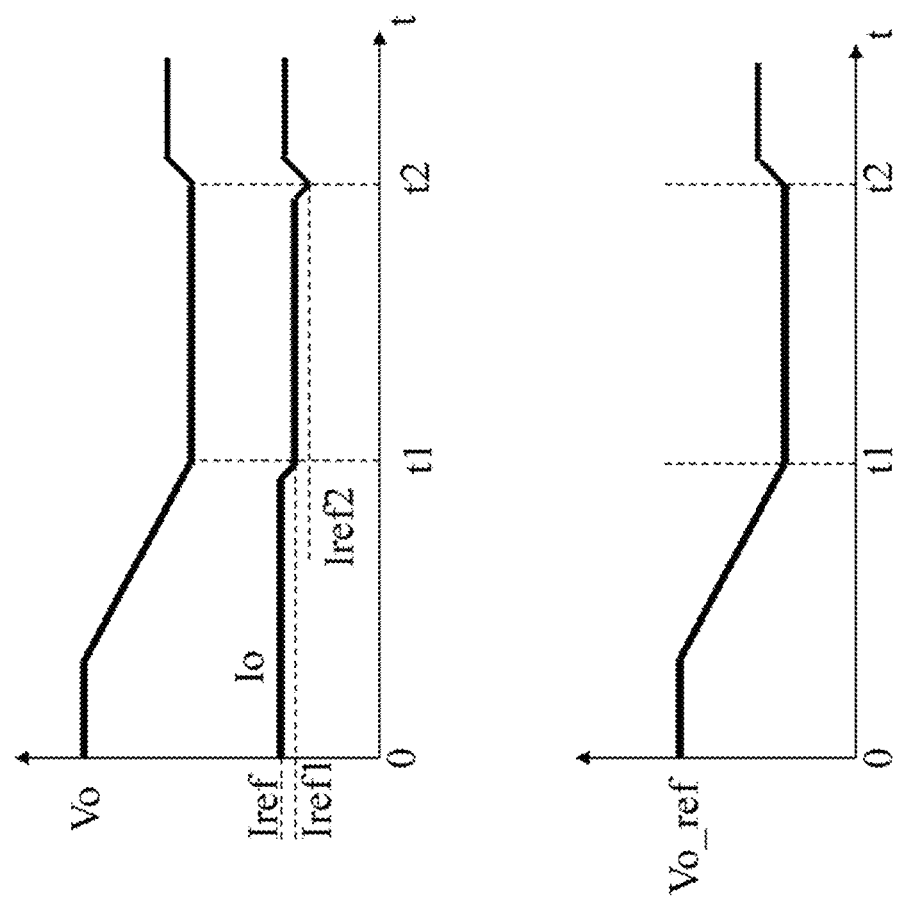
FIG. 7 illustrates a voltage waveform of the output voltage and the reference voltage and a current waveform of the current flowing through the LED string when an LED characteristic of the LED string of the voltage regulation circuit in FIG. 6 is changed.

FIG. 7 illustrates a voltage waveform of the output voltage and the reference voltage and a current waveform of the current flowing through the LED string when an LED characteristic of the LED string of the voltage regulation circuit in FIG. 6 is changed.

Referring to FIG. 7 (*a*) and FIG. 7 (*b*), at the preceding moment during the operation of the circuit, the current flowing through the LED driving module is Iref1, and the voltage Vo outputted by the voltage conversion module corresponds to the current Iref1. When the LED characteristic of the LED string is changed and the current flowing through the LED driving module is smaller than a second reference current, the reference voltage controller 506 increases the reference voltage Vo_ref. The control module outputs a second control signal according to the reference voltage Vo_ref and the feedback voltage Vo_back. The voltage conversion module increases the second voltage Vo according to the second control signal. Furthermore, when the second voltage Vo obtained based on the second control signal is smaller than a rated voltage, the current flowing through the LED driving module is continuously sampled.

In a specific embodiment, the second reference current is about 80%~100% of the first reference current. Preferably, the second reference current is about 95% of the first reference current.

Figure 8:
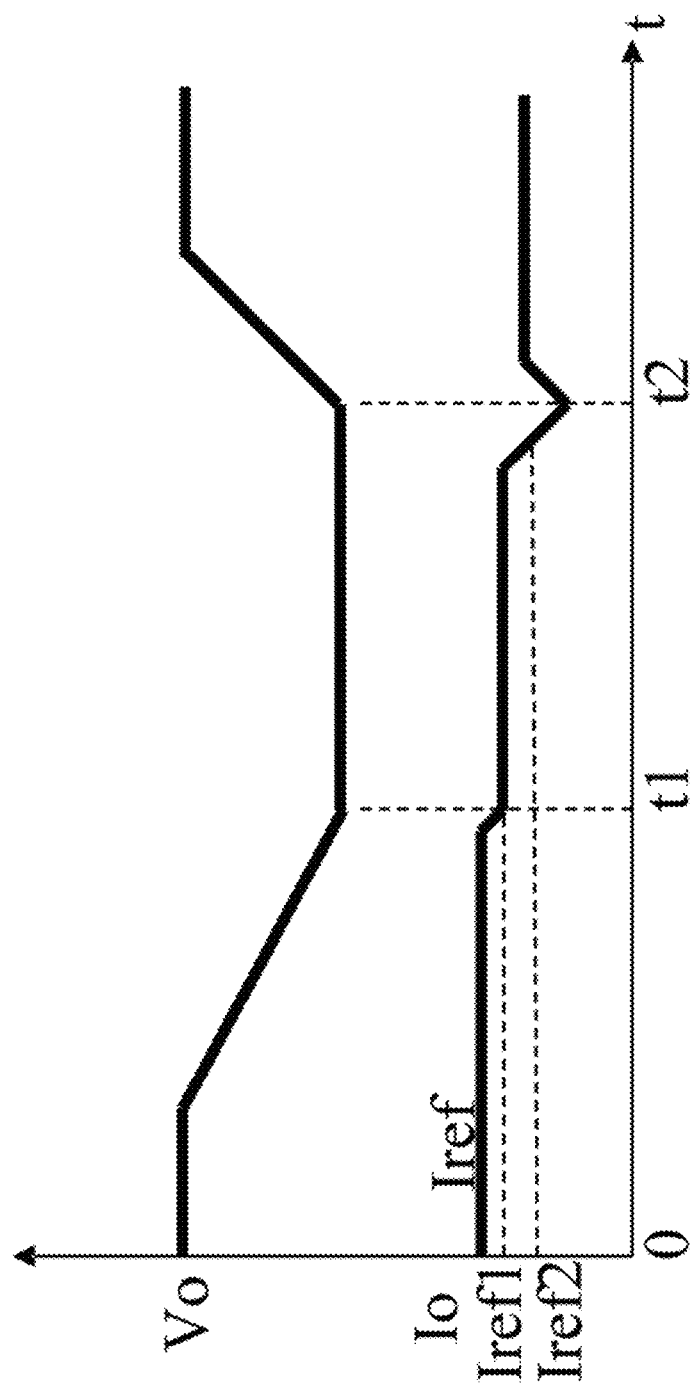
FIG. 8 illustrates a voltage waveform of the output voltage and a current waveform of the current flowing through the LED string when a LED string of the voltage regulation circuit in FIG. 6 is disconnected.

FIG. 8 illustrates a voltage waveform of the output voltage and a current waveform of the current flowing through the LED string when a LED string of the voltage regulation circuit in FIG. 6 is disconnected.

Referring to FIG. 8, when any LED string of the LED driving module is damaged or disconnected, the comparison is made based on the previous rated current. The second voltage Vo is regulated to the rated voltage, and meanwhile the rated current has to be reset, and the present current flowing through the LED driving module is compared with the reset rated current. Then, the control module outputs a third control signal according to the comparison result, so that the output voltage Vo can be regulated by using the aforementioned voltage regulation scheme, such as the voltage regulation scheme in FIG. 7.

Figure 9:
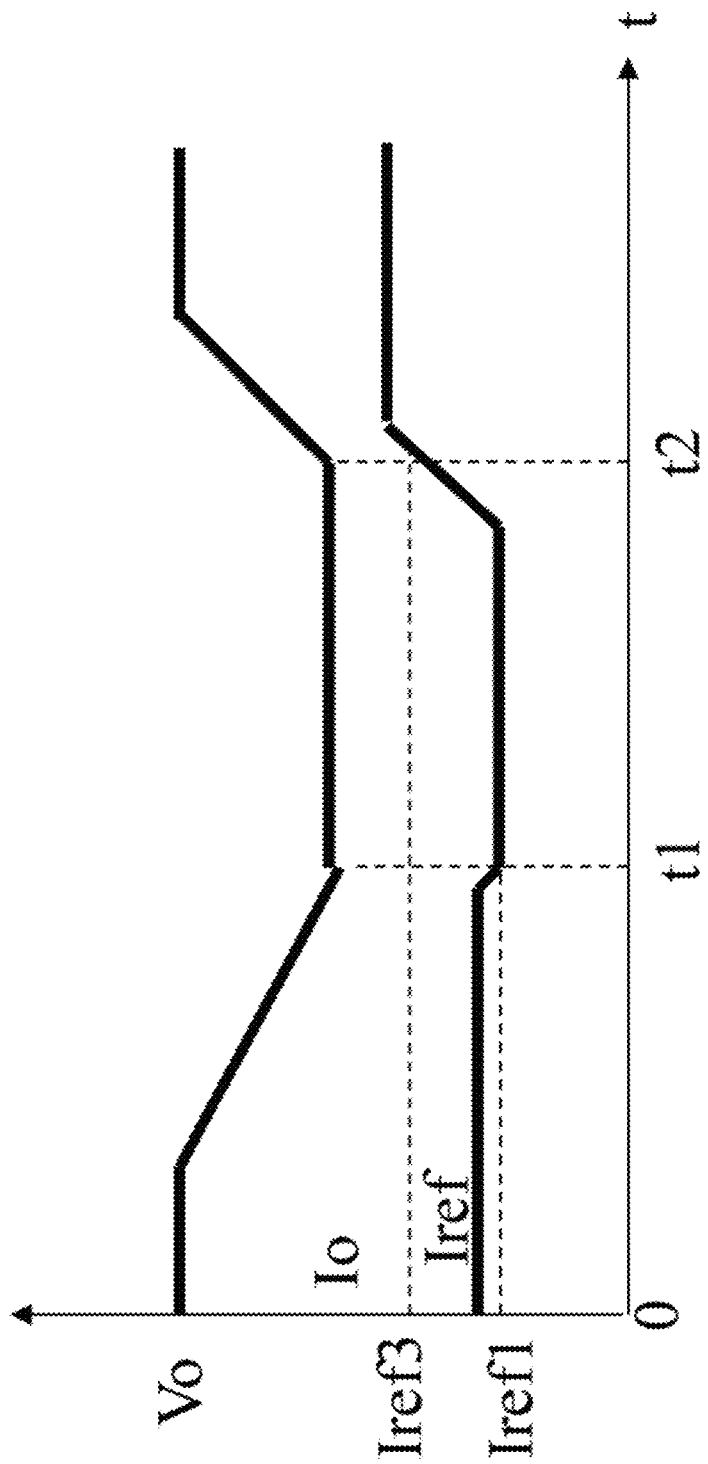
FIG. 9 illustrates a voltage waveform of the output voltage and a current waveform of the current flowing through the LED string when a new LED string is incorporated into the voltage regulation circuit in FIG. 6.

FIG. 9 illustrates a voltage waveform of the output voltage and a current waveform of the current flowing through the LED string when a new LED string is incorporated into the voltage regulation circuit in FIG. 6.

Referring to FIG. 9, when a new LED string is incorporated into the LED driving module, and the current flowing through the LED driving module is greater than a third reference current, the control module outputs a fourth control signal. The voltage conversion module increases the second voltage Vo to a rated voltage according to the fourth control signal, and meanwhile the rated current has to be reset, such that the output voltage Vo can be regulated again by using aforementioned above voltage regulation scheme.

In a specific embodiment, the third reference current is about 100%~130% of the first reference current. Preferably, the third reference current is about 120% of the first reference current.

Figure 10:
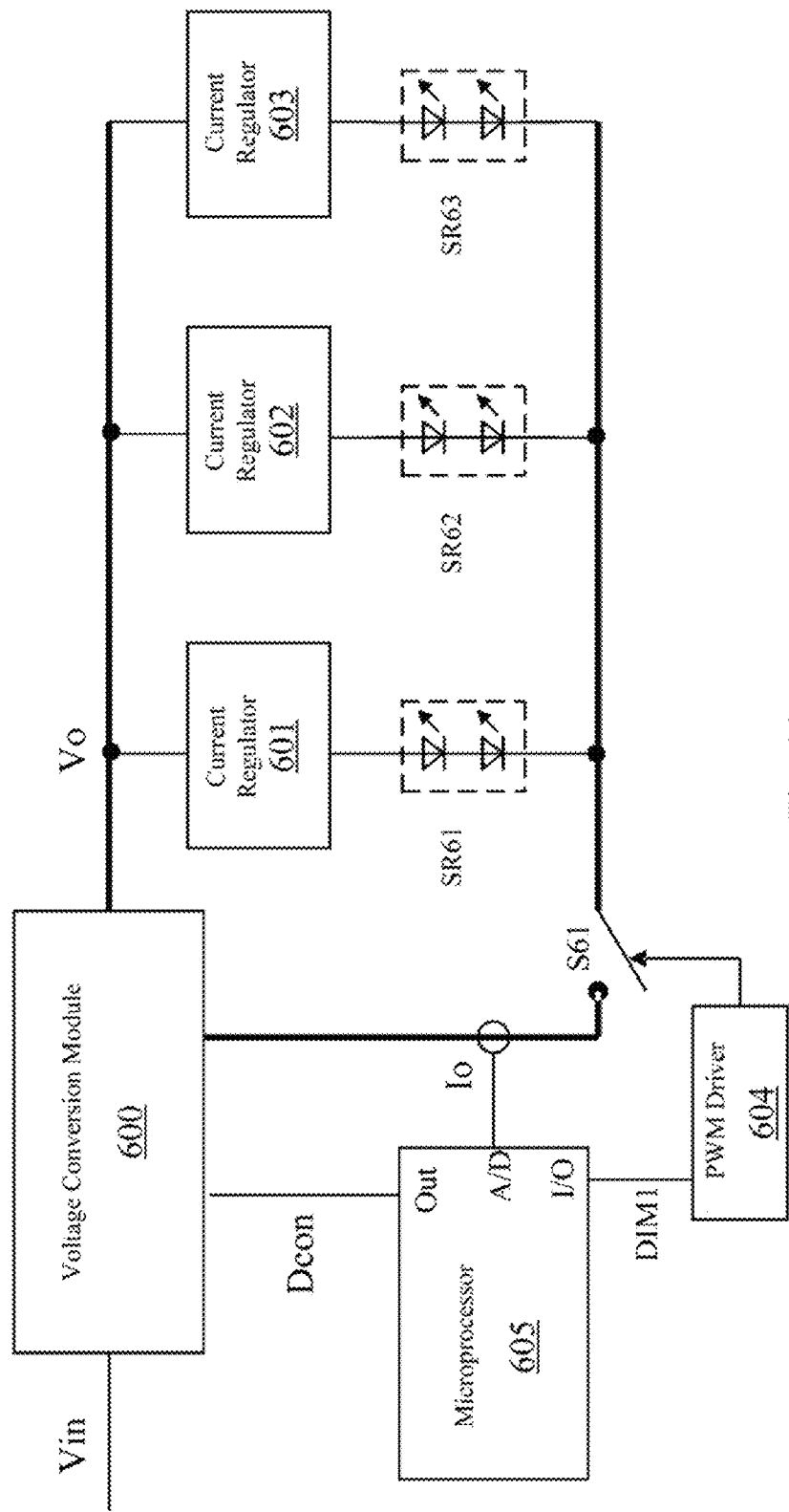
FIG. 10 is a circuit structural view of a control module of the voltage regulation circuit in FIG. 3 according to a preferred embodiment.

FIG. 10 is a circuit structural view of a control module of the voltage regulation circuit in FIG. 3 according to a preferred embodiment. Referring to FIG. 10, the control module includes a microprocessor 605. The microprocessor 605 has a modulus conversion interface (marked as A/D) and an output end (marked as Out). The modulus conversion interface is operable to sample the current Io flowing through the LED driving module and convert the sampled current Io to a digital signal. The output end is operable to output a control signal corresponding to the digital signal.

In a specific embodiment, the voltage regulation circuit further includes a light modulation switch S61. The microprocessor 605 further has a PWM output end (marked as I/O). The PWM output end output a PWM signal DIM1 to control the light modulation switch S61, so as to regulate an average current flowing through the LED string. Preferably, the voltage regulation circuit further includes a PWM driver 604. The PWM driver 604 is disposed between the PWM output end of the microprocessor 605 and the light modulation switch S61 and operable to amplify the PWM signal DIM1. It can be known from the above that the voltage regulation circuit in FIG. 10 outputs the corresponding control signal by sampling the current flowing through the LED driving module, and further regulates the output voltage of the voltage conversion module, so as to reduce the loss of the current regulator. Furthermore, the light modulation switch is used to regulate the average current of the LED string.

Figure 11:
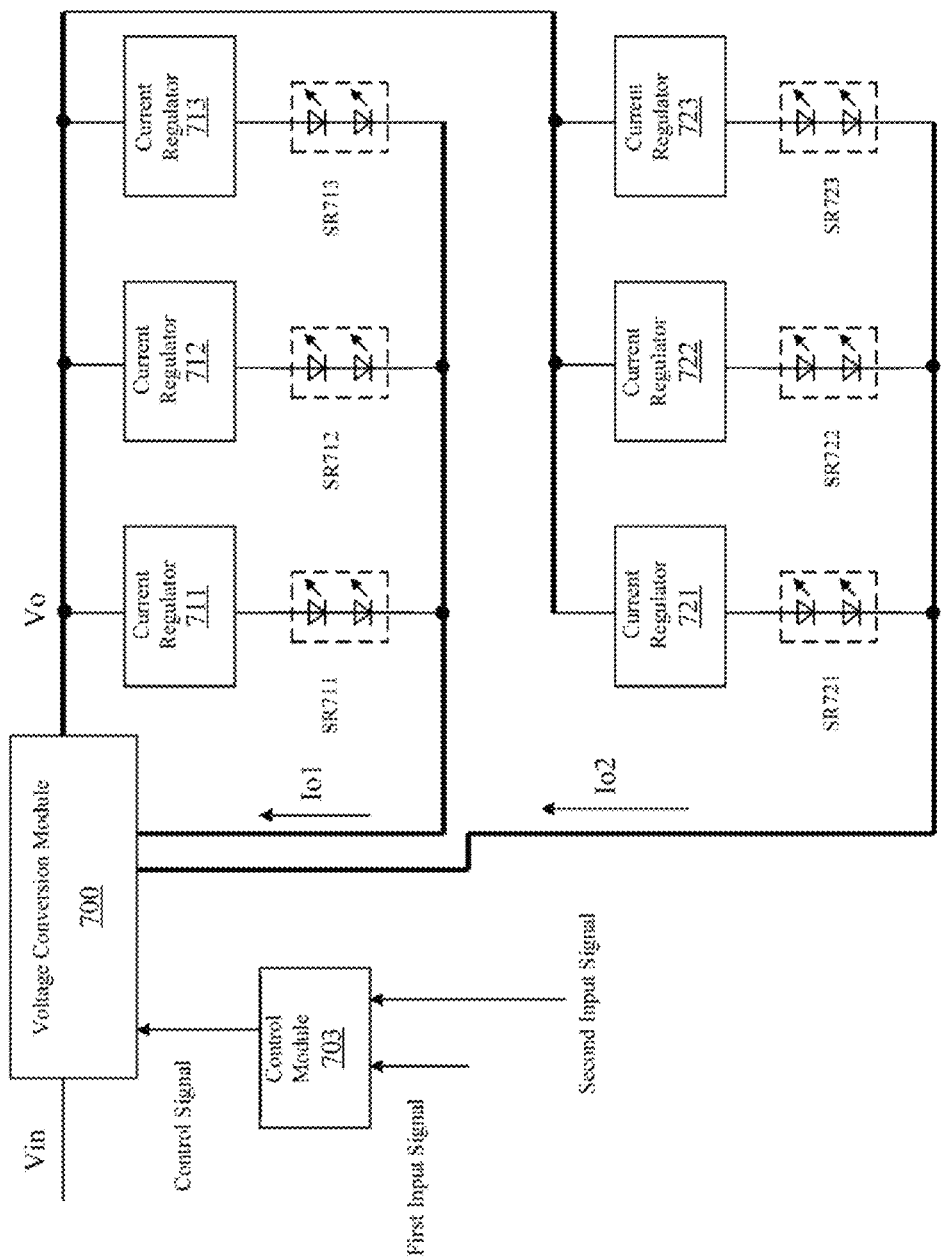
FIG. 11 is a principle diagram of a voltage regulation circuit for an LED driving apparatus according to an embodiment of the present disclosure.
Figure 12:
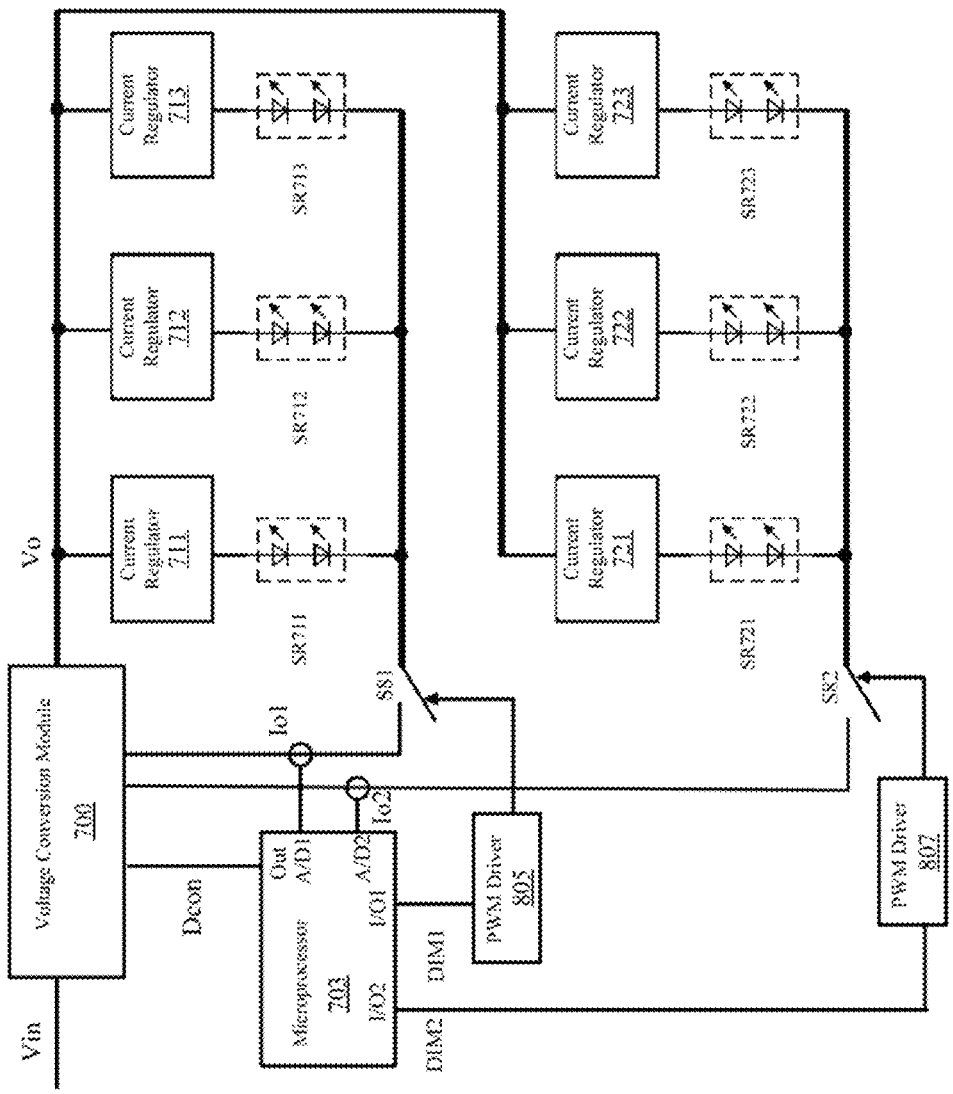
FIG. 12 is a circuit structural view of a control module of the voltage regulation circuit in FIG. 11 according to a preferred embodiment.

FIG. 11 is a principle diagram of a voltage regulation circuit for an LED driving apparatus according to an embodiment of the present disclosure, and FIG. 12 is a circuit structural view of a control module of the voltage regulation circuit in FIG. 11 according to a preferred embodiment.

Referring to FIG. 11, the voltage regulation circuit includes a voltage conversion module 700, a first LED driving module, a Second LED driving module and a control module 703. The first LED driving module includes three LED driving loops, which are the current regulator 711 and the LED string SR711; the current regulator 712 and the LED string SR712; and the current regulator 713 and the LED string SR713. The second LED driving module also includes three LED driving loops, which are the current regulator 721 and the LED string SR721; the current regulator 722 and the LED string SR722; and the current regulator 723 and the LED string SR723.

Similar to the voltage conversion module 300, the voltage conversion module 700 receives a first voltage Vin and converts the first voltage Vin to a second voltage Vo. The first voltage Vin is a DC voltage or an AC voltage, and the second voltage Vo is a DC voltage.

The control module 703 receives a first input signal and a second input signal, and outputs a control signal to the voltage conversion module 700 according to the first input signal and/or the second input signal. The first input signal reflects the current Io1 flowing through the first LED driving module. The second input signal reflects the current Io2 flowing through the second LED driving module. Then the voltage conversion module 700 regulates the second voltage Vo according to the control signal, such that the regulated second voltage Vo can still keep the brightness of the LED string of each LED driving loop of the first LED driving module and the second LED driving module unchanged. In a specific embodiment, the control module 703 is implemented by an analog circuit. In a specific embodiment, the control module 703 is implemented by a digital circuit.

In a specific embodiment, the control module 703 includes a microprocessor. The microprocessor has a first modulus conversion interface (marked as A/D1), a second modulus conversion interface (marked as A/D2) and an output end (marked as Out). The first modulus conversion interface samples a first current signal 101 flowing through the first LED driving module and converts the first current signal Io1 to a first digital signal. The second modulus conversion interface is operable to sample a second current signal Io2 flowing through the second LED driving module and convert the second current signal Io2 to a second digital signal. The output end outputs the control signal to the voltage conversion module 700 according to the first digital signal and/or the second digital signal.

In some embodiments, when a critical value V1 of the second voltage obtained after being regulated by the voltage regulation circuit based on the first digital signal is higher than a critical value V2 of the second voltage obtained after being regulated by the voltage regulation circuit based on the second digital signal, the output end of the microprocessor outputs the control signal according to the first digital signal.

In a specific embodiment, the voltage conversion module 700 includes a PFC circuit and a DC-DC converter electrically connected to the PFC circuit. In another specific embodiment, the voltage conversion module includes an AC-DC converter. In another detailed embodiment, the voltage conversion module includes a DC-DC converter.

In still another specific embodiment, the first LED driving module further includes a first light modulation switch S81, and the microprocessor further has a first output end (marked as I/O1). The first output end outputs a first PWM signal DIM1 to control the first light modulation switch, so as to regulate the average current flowing through the LED string of the first LED driving module. Furthermore, the voltage regulation circuit further includes a first PWM driver 805. The first PWM driver 805 is disposed between the first output end of the microprocessor and the first light modulation switch S81 and is operable to amplify the first PWM signal DIM1.

In still another specific embodiment, the second LED driving module further includes a second light modulation switch S82, and the microprocessor further has a second output end (marked as I/O2). The second output end outputs a second PWM signal DIM2 to control the second light modulation switch S82, so as to regulate the average current flowing through the LED string of the second LED driving module. Furthermore, the voltage regulation circuit further includes a second PWM driver 807. The second PWM driver 807 is disposed between the second output end of the microprocessor and the second light modulation switch S82 and is operable to amplify the second PWM signal DIM2.

According to the voltage regulation circuit and the LED driving apparatus having the same of the present disclosure, the control module is used to receive the input signal operable to reflect the current flowing through the LED driving module and output the corresponding control signal according to the input signal, and further to regulate the output voltage of the voltage conversion module, such that the output voltage can still keep the brightness of the LED string of each LED driving loop unchanged and further significantly reduce the loss of the current regulator, thereby improving the system efficiency.

Although the present disclosure has been disclosed with reference to the above embodiments, these embodiments are not intended to limit the present disclosure. It will be apparent to those skilled in the art that various modifications and variations can be made without departing from the scope or spirit of the present disclosure. Therefore, the scope of the present disclosure shall be defined by the appended claims.

What is claimed is:

1. A voltage regulation circuit adapted for an LED (Light-Emitting Diode) driver, the voltage regulation circuit comprising:
   a voltage conversion module operable to receive a first voltage and convert the first voltage to a second voltage, wherein the first voltage is a DC voltage or an AC voltage, and the second voltage is a DC voltage;
   an LED driving module, comprising at least one LED driving loop, and each of the at least one LED driving loop having:
      a current regulator electrically connected to the second voltage outputted by the voltage conversion module; and
      an LED string connected in series with the current regulator; and
   a control module operable to receive an input signal and output a control signal to the voltage conversion module according to the input signal, wherein the input signal reflects a current flowing through the LED driving module,
   wherein the voltage conversion module regulates the second voltage by increasing or decreasing the second voltage according to the control signal, such that the regulated second voltage keeps the brightness of the LED string of each LED driving loop unchanged;
   when the current flowing through the LED driving module is greater than a first reference current, the control module outputs a first control signal, and the voltage conversion module reduces the second voltage according to the first control signal; and when a new LED string is incorporated into the LED driving module and the current flowing through the LED driving module is greater than a third reference current, the control module outputs a fourth control signal, and the voltage conversion module increases the second voltage to a rated voltage according to the fourth control signal.

2. The voltage regulation circuit of claim 1, wherein the control module comprises:

a comparator having a first input end, a second input end and an output end, wherein the first input end is operable to receive a reference voltage corresponding to the second voltage, the second input end is operable to receive a feedback voltage corresponding to the second voltage, and the output end outputs a comparison signal, and the input signal is superposed on the reference voltage of the first input end of the comparator or the feedback voltage of the second input end of the comparator; and a control unit which is electrically connected to the output end of the comparator and is operable to receive the comparison signal and output the control signal according to the comparison signal.

3. The voltage regulation circuit of claim 1, wherein the control module further comprises:

a comparator having a first input end, a second input end, a third input end operable and an output end, wherein the first input end is operable to receive a reference voltage corresponding to the second voltage, and the second input end is operable to receive a feedback voltage corresponding to the second voltage, and the third input end is operable to receive the input signal, and the output end outputs a comparison signal.

4. The voltage regulation circuit of claim 1, wherein the current regulator is a linear regulator.

5. The voltage regulation circuit of claim 1, wherein the first reference current is substantially 80%~100% of a rated current flowing through the LED driving module.

6. The voltage regulation circuit of claim 5, wherein the first reference current is substantially 95% of the rated current flowing through the LED driving module.

7. The voltage regulation circuit of claim 1, wherein when the current flowing through the LED driving module is smaller than a second reference current, the control module outputs a second control signal, and the voltage conversion module increases the second voltage according to the second control signal.

8. The voltage regulation circuit of claim 7, wherein when the second voltage obtained based on the second control signal is smaller than a rated voltage, the current flowing through the LED driving module is continuously sampled.

9. The voltage regulation circuit of claim 7, wherein the second reference current is substantially 80%~100% of the first reference current.

10. The voltage regulation circuit of claim 9, wherein the second reference current is substantially 95% of the first reference current.

11. The voltage regulation circuit of claim 7, wherein when the second voltage is equal to the rated voltage, the rated current flowing through the LED driving module is reset, and the current flowing through the LED driving module is compared with the reset rated current, and the control module outputs a third control signal according to the comparison result, and the voltage conversion module regulates the second voltage according to the third control signal.

12. The voltage regulation circuit of claim 1, wherein the third reference current is substantially 100%~130% of the first reference current.

13. The voltage regulation circuit of claim 12, wherein the third reference current is substantially 120% of the first reference current.

14. The voltage regulation circuit of claim 1, wherein the voltage conversion module comprises:

an isolating transformer having a primary winding and a secondary winding, wherein one end of the primary winding is electrically connected to the first voltage, and the secondary winding is electrically connected to the second voltage;

a power switch having a first end, a second end and a third end, wherein the second end is electrically connected to the other end of the primary winding, and the third end is electrically connected to the first voltage; and a driving circuit which is electrically connected to the first end of the power switch and the control module, and is operable to amplify the control signal and drive the power switch to execute a turn-on/turn-off operation based on the control signal, so as to regulate the second voltage by regulating the first voltage.

15. The voltage regulation circuit of claim 1, wherein the control module comprises a microprocessor, and the microprocessor has:

a modulus conversion interface which is operable to sample the current flowing through the LED driving module and convert the current sampled to a digital signal; and an output end operable to output the control signal corresponding to the digital signal.

16. The voltage regulation circuit of claim 15, wherein the voltage regulation circuit further comprises a light modulation switch and a PWM driver, and the microprocessor further has a pulse-width modulation (PWM) output end, wherein the PWM driver is disposed between the PWM output end of the microprocessor and the light modulation switch, and the PWM output end outputs a PWM signal, and the PWM driver is operable to amplify the PWM signal, such that the light modulation switch regulates an average current flowing through the LED string.

17. The voltage regulation circuit of claim 1, wherein currents flowing through the LED strings of different LED driving loops are different.

18. The voltage regulation circuit of claim 1, wherein the voltage conversion module comprises a power factor correction (PFC) circuit and a DC-DC converter electrically connected to the PFC circuit.

19. The voltage regulation circuit of claim 1, wherein the voltage conversion module comprises an AC-DC converter or a DC-DC converter.

20. A voltage regulation circuit adapted for an LED driver, the voltage regulation circuit comprising:

a voltage conversion module which is operable to receive a first voltage and convert the first voltage to a second voltage, wherein the first voltage is a DC voltage or an AC voltage, and the second voltage is a DC voltage;

a first LED driving module and a second LED driving module, each of the first LED driving module and the second LED driving module comprising at least one LED driving loop, each of the at least one LED driving loops having:

a current regulator electrically connected to the second voltage outputted by the voltage conversion module; and an LED string connected in series with the current regulator; and a control module which is operable to receive a first input signal and a second input signal, and output a control signal to the voltage conversion module according to the first input signal and/or the second input signal, wherein the first input signal reflects a current flowing through the first LED driving module, and the second input signal reflects a current flowing through the second LED driving module, the control module comprising a microprocessor, and the microprocessor having:

a first modulus conversion interface operable to sample a first current signal flowing through the first LED driving module and convert the first current signal to a first digital signal;

a second modulus conversion interface which is operable to sample a second current signal flowing through the second LED driving module and convert the second current signal to a second digital signal; and an output end operable to output the control signal to the voltage conversion module according to the first digital, signal and/or the second digital signal;

wherein the voltage conversion module regulates the second voltage by increasing or decreasing the second voltage according to the control signal, such that the regulated second voltage keeps a brightness of the LED string of each of the at least one LED driving loop of the first LED driving module and the second LED driving module unchanged; and when a critical value of the second voltage obtained by the voltage regulation circuit based on the regulation of the first digital signal is higher than a critical value of the second voltage obtained by the voltage regulation circuit based on the regulation of the second digital signal, the output end of the microprocessor outputs the control signal according to the first digital signal.

21. The voltage regulation circuit of claim 20, wherein the voltage regulation circuit further comprises a first PWM driver, and the first LED driving module further comprises a first light modulation switch, and the microprocessor further has a first output end, wherein the first output end outputs a first PWM signal, and the first PWM driver is disposed between the first output end of the microprocessor and the first light modulation switch and is operable to amplify the first PWM signal, thereby controlling the first light modulation switch, so as to regulate an average current flowing through the LED string of the first LED driving module.

22. The voltage regulation circuit of claim 20, wherein the voltage regulation circuit further comprises a second PWM driver, and the second LED driving module further comprises a second light modulation switch, and the microprocessor further has a second output end, wherein the second output end outputs a second PWM signal, and the second PWM driver is disposed between the second output end of the microprocessor and the second light modulation switch and is operable to amplify the second PWM signal, thereby controlling the second light modulation switch, so as to regulate an average current flowing through the LED string of the second LED driving module.

23. The voltage regulation circuit of claim 20, wherein the number of the at least one LED driving loop of the first LED driving module is equal to the number of the at least one LED driving loop of the second LED driving module.

24. The voltage regulation circuit of claim 20, wherein the voltage conversion module comprises a power factor correction (PFC) circuit and a DC-DC converter electrically connected to the PFC circuit.

25. The voltage regulation circuit of claim 20, wherein the voltage conversion module comprises an AC-DC converter or a DC-DC converter.

26. An LED driving apparatus, comprising:
at least one LED string; and
the voltage regulation circuit of claim 1.

27. An LED driving apparatus, comprising:
at least one LED string; and
the voltage regulation circuit of claim 20.

28. A voltage regulation circuit adapted for an LED (Light-Emitting Diode) driver, the voltage regulation circuit comprising:

a voltage conversion module operable to receive a first voltage and convert the first voltage to a second voltage, wherein the first voltage is a DC voltage or an AC voltage, and the second voltage is a DC voltage;

an LED driving module, comprising at least one LED driving loop and each of the at least one LED driving loop having:
a current regulator electrically connected to the second voltage outputted by the voltage conversion module; and
an LED string connected in series with the current regulator; and a control module operable to receive an input signal and output a control signal to the voltage conversion module according to the input signal, wherein the input signal reflects a current flowing through the LED driving module, wherein the voltage conversion module regulates the second voltage by increasing or decreasing the second voltage according to the control signal, such that the regulated second voltage keeps the brightness of the LED string of each LED driving loop unchanged;

when the current flowing through the LED driving module is greater than a first reference current, the control module outputs a first control signal, and the voltage conversion module reduces the second voltage according to the first control signal;

when the current flowing through the LED driving module is smaller than a second reference current, the control module outputs a second control signal, and the voltage conversion module increases the second voltage according to the second control signal; and when the second voltage is equal to the rated voltage, the rated current flowing through the LED driving module is reset, and the current flowing through the LED driving module is compared with the reset rated current, and the control module outputs a third control signal according to the comparison result, and the voltage conversion module regulates the second voltage according to the third control signal.

29. The voltage regulation circuit of claim 28, wherein the control module comprises:
a comparator having a first input end, a second input end and an output end, wherein the first input end is operable to receive a reference voltage corresponding to the second voltage, the second input end is operable to receive a feedback voltage corresponding to the second voltage, and the output end outputs a comparison signal, and the input signal is superposed on the reference voltage of the first input end of the comparator or the feedback voltage of the second input end of the comparator; and a control unit which is electrically connected to the output end of the comparator and is operable to receive the comparison signal and output the control signal according to the comparison signal.

30. The voltage regulation circuit of claim 28, wherein the control module further comprises:
a comparator having a first input end, a second input end, a third input end operable and an output end, wherein the first input end is operable to receive a reference voltage corresponding to the second voltage, and the second input end is operable to receive a feedback voltage corresponding to the second voltage, and the third input end is operable to receive the input signal, and the output end outputs a comparison signal.

31. The voltage regulation circuit of claim 28, wherein when a new LED string is incorporated into the LED driving module and the current flowing through the LED driving module is greater than a third reference current, the control module outputs a fourth control signal, and the voltage conversion module increases the second voltage to a rated voltage according to the fourth control signal.

32. The voltage regulation circuit of claim 28, wherein the voltage conversion module comprises:
an isolating transformer having a primary winding and a secondary winding, wherein one end of the primary winding is electrically connected to the first voltage, and the secondary winding is electrically connected to the second voltage;
a power switch having a first end, a second end and a third end, wherein the second end is electrically connected to the other end of the primary winding, and the third end is electrically connected to the first voltage; and
a driving circuit which is electrically connected to the first end of the power switch and the control module, and is operable to amplify the control signal and drive the power switch to execute a turn-on/turn-off operation based on the control signal, so as to regulate the second voltage by regulating the first voltage.

33. The voltage regulation circuit of claim 28, wherein the control module comprises a microprocessor, and the microprocessor has:
a modulus conversion interface which is operable to sample the current flowing through the LED driving module and convert the current sampled to a digital signal; and
an output end operable to output the control signal corresponding to the digital signal.

34. The voltage regulation circuit of claim 33, wherein the voltage regulation circuit further comprises a light modulation switch and a PWM driver, and the microprocessor further has a pulse-width modulation (PWM) output end, wherein the PWM driver is disposed between the PWM output end of the microprocessor and the light modulation switch, and the PWM output end outputs a PWM signal, and the PWM driver is operable to amplify the PWM signal, such that the light modulation switch regulates an average current flowing through the LED string.

\* \* \* \* \*